(12) United States Patent
Ojeda Pineda et al.

(10) Patent No.: US 12,042,786 B2
(45) Date of Patent: *Jul. 23, 2024

(54) PROCESS FOR PRODUCING A FISCHER-TROPSCH SYNTHESIS CATALYST

(71) Applicant: BP P.L.C., London (GB)

(72) Inventors: Manuel Ojeda Pineda, Hull (GB); Alexander James Paterson, Hull (GB)

(73) Assignee: BP P.L.C., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,742

(22) Filed: Dec. 2, 2022

(65) Prior Publication Data

US 2023/0105210 A1 Apr. 6, 2023

Related U.S. Application Data

(63) Continuation of application No. 16/485,371, filed as application No. PCT/EP2018/053350 on Feb. 9, 2018, now Pat. No. 11,517,883.

(30) Foreign Application Priority Data

Feb. 10, 2017 (GB) ..................... 1702251

(51) Int. Cl.
| | |
|---|---|
| B01J 21/06 | (2006.01) |
| B01J 23/75 | (2006.01) |
| B01J 23/889 | (2006.01) |
| B01J 35/00 | (2024.01) |
| B01J 35/02 | (2006.01) |
| B01J 35/30 | (2024.01) |
| B01J 35/40 | (2024.01) |
| B01J 35/50 | (2024.01) |
| B01J 37/00 | (2006.01) |
| B01J 37/02 | (2006.01) |
| B01J 37/08 | (2006.01) |
| B01J 37/18 | (2006.01) |
| C10G 2/00 | (2006.01) |

(52) U.S. Cl.
CPC ......... *B01J 23/8892* (2013.01); *B01J 21/063* (2013.01); *B01J 23/75* (2013.01); *B01J 35/19* (2024.01); *B01J 35/393* (2024.01); *B01J 35/40* (2024.01); *B01J 35/50* (2024.01); *B01J 37/0018* (2013.01); *B01J 37/0203* (2013.01); *B01J 37/0209* (2013.01); *B01J 37/0236* (2013.01); *B01J 37/088* (2013.01); *B01J 37/18* (2013.01); *C10G 2/331* (2013.01); *C10G 2300/70* (2013.01)

(58) Field of Classification Search
CPC ........ B01J 21/63; B01J 23/75; B01J 23/8892; B01J 35/0006; B01J 35/006; B01J 35/023; B01J 35/026; B01J 37/0018; B01J 37/0203; B01J 37/0209; B01J 37/0236; B01J 37/088; B01J 37/18
See application file for complete search history.

(56) References Cited

U.S. PATENT DOCUMENTS

| | | | |
|---|---|---|---|
| 6,130,184 A | 10/2000 | Johannes et al. | |
| 7,163,963 B2 | 1/2007 | Fraenkel | |
| 7,244,689 B2 | 7/2007 | Addiego et al. | |
| 7,541,310 B2 | 6/2009 | Espinoza et al. | |
| 7,560,412 B2 | 7/2009 | Osborne et al. | |
| 8,062,620 B2 | 11/2011 | Dogterom et al. | |
| 8,148,292 B2 | 4/2012 | Soled et al. | |
| 8,815,768 B2 * | 8/2014 | Zhou ...................... | B01J 23/898 502/262 |
| 8,841,229 B2 | 9/2014 | Terorde et al. | |
| 8,865,609 B2 * | 10/2014 | Zhou ...................... | B01J 23/002 502/100 |

(Continued)

FOREIGN PATENT DOCUMENTS

| | | |
|---|---|---|
| JP | H05-161847 A | 6/1993 |
| JP | 2004237254 A | 8/2004 |

(Continued)

OTHER PUBLICATIONS

International Search Report and Written Opinion of the International Searching Authority for International Application No. PCT/EP2018/053350, mailed Apr. 24, 2018.

(Continued)

*Primary Examiner* — Cam N. Nguyen
(74) *Attorney, Agent, or Firm* — McDonnell Boehnen Hulbert & Berghoff LLP

(57) ABSTRACT

The present invention relates to a process for conveniently preparing a supported cobalt-containing Fischer-Tropsch synthesis catalyst having improved activity and selectivity for $C_{5+}$ hydrocarbons. In one aspect, the present invention provides a process for preparing a supported cobalt-containing Fischer-Tropsch synthesis catalyst, said process comprising the steps of: (a) impregnating a support material with: i) a cobalt-containing compound and ii) acetic acid, or a manganese salt of acetic acid, in a single impregnation step to form an impregnated support material; and (b) drying and calcining the impregnated support material; wherein the support material impregnated in step (a) has not previously been modified with a source of metal other than cobalt; and wherein when the cobalt-containing compound is cobalt hydroxide, a manganese salt of acetic acid is not used in step (a) of the process.

16 Claims, No Drawings

(56) References Cited

U.S. PATENT DOCUMENTS

| | | | |
|---|---|---|---|
| 8,975,200 B2* | 3/2015 | Zhou | B01J 23/8986 |
| | | | 568/885 |
| 8,980,789 B2* | 3/2015 | Zhou | B01J 23/847 |
| | | | 568/885 |
| 9,168,515 B2 | 10/2015 | Wang et al. | |
| 9,308,523 B2* | 4/2016 | Zhou | B01J 37/024 |
| 9,359,270 B2* | 6/2016 | Daly | B01J 8/00 |
| 9,527,061 B2 | 12/2016 | Sandee et al. | |
| 10,569,258 B2 | 2/2020 | Klemt et al. | |
| 2013/0178663 A1* | 7/2013 | Zhou | C07C 29/149 |
| | | | 502/313 |
| 2013/0178670 A1* | 7/2013 | Zhou | C07C 29/149 |
| | | | 502/319 |

FOREIGN PATENT DOCUMENTS

| | | | |
|---|---|---|---|
| JP | 2006-205019 A | 8/2006 | |
| RU | 2486010 C1 | 6/2013 | |
| WO | 2008122637 A2 | 10/2008 | |
| WO | 2010/049715 A1 | 5/2010 | |
| WO | 2017/009427 A1 | 1/2017 | |

OTHER PUBLICATIONS

Liu, Y., et al., "The effect of acetic acid pretreatment for cobalt catalysts prepared from cobalt nitrate." Cat. Commun. 8 (2007) 773-776.

Great Britain Intellectual Property Office Search Report for GB1702251.8, 5 pages, mailed Aug. 7, 2017.

Bezemer, et al., "Cobalt particle size effects in the Fischer-Tropsch reaction studies with carbon nanofiber supported catalysts." J. Am Chem. Sco. 128:3956-3964 (2006).

Zhang, et al., "The solvent effects during preparation of Fischer-Tropsch synthesis catalysts: improvedment os reducibility, dispersion of supported cobalt and stability of catalyst." Cat. Today 142:85-89 (2009).

* cited by examiner

PROCESS FOR PRODUCING A FISCHER-TROPSCH SYNTHESIS CATALYST

This application is continuation application of U.S. patent application Ser. No. 16/485,371, which is a national stage application under 35 U.S.C. § 371 of International Application No. PCT/EP2018/053350, filed Feb. 9, 2018, which claims priority to Great Britain Patent Application No. GB 1702251.8, filed Feb. 10, 2017, the disclosures of which are explicitly incorporated by reference herein.

This invention relates to a process for producing a Fischer-Tropsch synthesis catalyst. In particular, the invention relates to a process for preparing a supported cobalt-containing Fischer-Tropsch catalyst, which process comprises simultaneously modifying a support material with a cobalt-containing compound and acetic acid, or a manganese salt thereof, in order to provide a catalyst having improved activity and selectivity for $C_{5+}$ hydrocarbons. The present invention also relates to the use of acetic acid, or a certain metal salt thereof, preferably a manganese salt thereof, for controlling cobalt oxide crystallite size in the preparation of a supported cobalt-containing Fischer-Tropsch synthesis catalyst.

The conversion of synthesis gas into hydrocarbons by the Fischer-Tropsch process has been known for many years. The growing importance of alternative energy sources has seen renewed interest in the Fischer-Tropsch process as one of the more attractive direct and environmentally acceptable routes to high quality transportation fuels.

Many metals, for example cobalt, nickel, iron, molybdenum, tungsten, thorium, ruthenium, rhenium and platinum are known to be catalytically active, either alone or in combination, in the conversion of synthesis gas into hydrocarbons and oxygenated derivatives thereof. Of the aforesaid metals, cobalt, nickel and iron have been studied most extensively. Generally, the metals are used in combination with a support material, of which the most common are alumina, silica and carbon.

In the preparation of supported cobalt-containing Fischer-Tropsch synthesis catalysts, a solid support material is typically impregnated with a cobalt-containing compound, which may for instance be an organometallic or inorganic compound (e.g. $Co(NO_3)_2 \cdot 6H_2O$), by contacting with a solution of the compound. The particular form of cobalt-containing compound is generally selected for its ability to form a cobalt oxide (for instance, CoO, $Co_2O_3$ or $Co_3O_4$) following a subsequent calcination/oxidation step. Following generation of the supported cobalt oxide, a reduction step is necessary in order to form the pure cobalt metal as the active catalytic species. Thus, the reduction step is also commonly referred to as an activation step.

During calcination, cobalt oxides form crystallites on the support material, and the properties of such crystallites, such as dispersion, particle size and reduction degree, are known to have an effect on the activity and selectivity of the catalyst in Fischer-Tropsch processes. For example, de Jong et al (J. Am. Chem. Soc., 128, 2006, 3956) showed that for optimal activity and selectivity, cobalt metal particles in the active catalyst having sizes of around 6 to 8 nm are particularly beneficial.

Modification of the support material, or a support material impregnated with cobalt oxides, has been investigated for its impact upon activity and selectivity of the active catalyst in Fischer-Tropsch processes.

Pre-treatment of the support material has been used in the past to influence the selectivity and/or activity of a cobalt-containing supported Fischer-Tropsch synthesis catalyst. For instance, Zhang et al (Catalysis Today, 142, 2009, 85-89) describe a two-step impregnation process comprising the pre-treatment of a silica support with acetic acid followed by drying in air at 100° C. and prior to impregnating the support with cobalt nitrate. The authors note an improvement in dispersion of supported cobalt as a result of the pre-treatment which can give rise to high catalytic activity if the reduction degree of the cobalt particles is also simultaneously high. A reduction in cobalt oxide particle size was also observed as a result of the pre-treatment, although the smallest cobalt particle size observed by X-ray diffraction (XRD) was 16 nm—significantly higher than the optimum range reported in de Jong et al.

U.S. Pat. No. 7,163,963 describes pre-treatment of an alumina support with a rare earth metal compound in order to provide a surface layer between the support and the cobalt added in a second impregnation step. This is said to encourage the formation of larger and more uniform crystallites as a result of a less acidic surface layer, which is also said to aid subsequent reduction of the cobalt oxide and dispersion of the catalytically active metal.

Post-treatment of a cobalt catalyst impregnated onto silica has also been described by Liu et al (Catalysis Communications, 8, 2007, 773-776), where a two-step impregnation process comprised impregnating a silica support with cobalt nitrate, drying at 120° C., then treating the pre-impregnated support with acetic acid. The authors note an increase in catalyst activity, specifically for a liquid phase Fischer-Tropsch synthesis reaction, for catalysts which include a secondary treatment with acetic acid, which is thought to be a result of simultaneously maintaining a high reduction degree and high dispersion of supported cobalt.

There remains a need for a process for conveniently producing a Fischer-Tropsch synthesis catalyst which exhibits improved selectivity for $C_{5+}$ hydrocarbons, which hydrocarbons are of most value for preparing fuel compositions, and/or improved catalytic activity in subsequent Fischer-Tropsch reactions.

It has now been surprisingly found that by impregnating a support material with a cobalt containing compound in combination with acetic acid or a certain metal salt of acetic acid, such as a manganese salt of acetic acid, the size of cobalt oxide crystallites formed on the support may be advantageously controlled to produce a Fischer-Tropsch catalyst having increased activity and selectivity.

Thus, the present invention provides a process for preparing a supported cobalt-containing Fischer-Tropsch synthesis catalyst, said process comprising the steps of:
  (a) impregnating a support material with: i) a cobalt-containing compound and ii) acetic acid, or a manganese salt of acetic acid, in a single impregnation step to form an impregnated support material; and
  (b) drying and calcining the impregnated support material;
  wherein the support material impregnated in step (a) has not previously been modified with a source of metal other than cobalt; and
  wherein when the cobalt-containing compound is cobalt hydroxide, a manganese salt of acetic acid is not used in step (a) of the process.

The time at which the acetic acid or manganese salt of acetic acid is added to the process has been found to be key in the process of the present invention. In particular, the benefits of the invention may be realised by impregnating a support material with a cobalt-containing compound and acetic acid or a manganese salt of acetic acid in a single impregnation step prior to drying and calcining. By modifying the support in this manner, it is possible to advantageously control the size of the supported cobalt oxide crystallites which form on the support material during the calcination step in comparison to where acetic acid or a manganese salt of acetic acid are not used, or where they are employed in a pre- or post-treatment (i.e. before or after impregnation of cobalt-containing compound and drying/calcination in a separate impregnation).

Following drying and calcining, cobalt metal precursors, typically cobalt nitrate salts, are decomposed to leave cobalt oxides on the surface of the support material. During this process, organic molecules and by-products of the decomposition of the metal precursors are typically vapourized as a result of the elevated temperatures applied. Therefore, it is surprising that the addition of an organic compound such as acetic acid has such a positive effect on catalyst performance, when the acetic acid itself, or the acetate of the manganese salt of acetic acid, would be expected to be vapourized and driven off, or thermally decomposed to an extent that undesirable carbon deposition on the support may occur. Even the use of a drying step performed at elevated temperature would be expected to remove small organic molecules such as acetic acid from the support material, particularly where drying is performed at temperatures of 100° C. or more.

Without being bound by any particular theory, it is believed that the acetic acid, or the manganese salt of acetic acid, may undergo a form of dissociative adsorption on to the support surface forming an acetate species which influences cobalt oxide crystallite development which occurs simultaneously. In addition, it is believed that mobility of both the cobalt-containing compound and acetic acid, or manganese salt thereof, at the surface of the support, for instance whilst suspended or dissolved in an impregnation solution, allows the full benefit of the presence of the acetic acid, or manganese salt thereof, to be obtained. This is in contrast to where the cobalt-containing compound and acetic acid, or manganese salt thereof, are impregnated in separate impregnation steps with at least a drying step performed between impregnations (i.e. application of acetic acid, or the manganese salt thereof, in pre-or post-treatments).

Thus, the impregnation of the support material with a cobalt-containing compound and acetic acid, or acetate of the manganese salt of acetic acid, occurs in a single step in accordance with the present invention, without any intermediate drying or calcination steps to separate the loading of the different components. Therefore, according to the present invention, a Fischer-Tropsch catalyst having improved activity and selectivity may be produced in a single impregnation step, without the need for pre-treatment or post-treatment of the support material/impregnated support material. Thus, the present invention allows the convenient formation of a catalyst having improved activity and selectivity without the necessity of multiple processing steps, increasing efficiency.

In step (a) of the process of the present invention, a support material is impregnated with: i) a cobalt-containing compound and ii) acetic acid, or a manganese salt of acetic acid, in a single impregnation step to form an impregnated support material.

It will be understood that the support material may be in any form provided it is suitable for use as a support for a Fischer-Tropsch synthesis catalyst and also provided that the support material has not been previously impregnated with sources of metal other than cobalt which may have a deleterious effect on the performance of the active catalyst and may interfere with the benefits of the invention. Thus, whilst support material that has been previously loaded with cobalt metal, or a precursor thereof, may be used in accordance with the invention, other pre-treatments providing sources of other metals are to be avoided in accordance with the present invention.

A particular advantage of the present invention is the expediency with which a support material may be modified and converted into a Fischer-Tropsch synthesis catalyst using only a single impregnation step followed by a drying and calcination step. Thus, in preferred embodiments, the support material used in connection with the invention has undergone no prior modification, for instance by the addition of promoters, dispersion aids, strength aids and/or binders, or precursors thereof, before impregnation in step (a) of the process. In particularly preferred embodiments, the support material used in connection with the invention has undergone no pre-treatment with acetic acid or a manganese salt of acetic acid, before impregnation in step (a) of the process.

The support material may be in the form of an extrudate and impregnation step (a) forms an impregnated extrudate prior to step (b). Reference herein to an "extrudate" is intended to mean a support material that has undergone an extrusion step and therefore may be shaped. Alternatively, the support material may preferably be in the form of a powder or granulate. Reference herein to a powder or granulate of a support material is understood to refer to free flowing particles of a support material or particles of support material that have undergone granulation and/or sieving to be a particular shape (e.g. spherical) and size range. In the context of the present invention, the powder or granulate is in a form which is suitable for impregnation with a solution of cobalt-containing compound and acetic acid, or a manganese salt thereof, and subsequent extrusion.

In preferred embodiments, the support material is in the form of a powder or granulate and impregnation step (a) forms an impregnated support powder or granulate, the process further comprising extruding the impregnated support powder or granulate to form an extrudate prior to step (b).

In some embodiments, the support material is in the form of a powder or granulate and impregnation step (a) forms an impregnated support powder or granulate and calcination in step (b) forms a calcined powder or granulate, the process further comprising extruding the calcined powder or granulate to form an extrudate.

Thus, it will be appreciated that the support material, impregnated with a cobalt containing compound and acetic acid, or manganese salt thereof, may be extruded at any suitable stage before or after drying and calcining. It is only essential that the support material be impregnated with both a cobalt-containing compound and acetic acid or manganese acetate prior to drying and calcining steps by means of a single impregnation step. It will also be appreciated that the cobalt-containing compound and the acetic acid, or manganese salt thereof, may be impregnated onto the support material using a single solution/suspension of the components or by means of separate solutions/suspensions of the components which are mixed with the support material sequentially, provided that there are no drying or calcining steps carried out in between.

The support material used with the present invention is not particularly limited and may be selected from any suitable refractory metal oxide or silicates known in the art, or combinations thereof. Preferably, the support material is selected from the group consisting of silica, alumina, silica/alumina, ceria, gallia, zirconia, titania, magnesia, zinc oxide, and mixtures thereof. More preferably, the support material is selected from titania and zinc oxide. Most preferably, the support material is selected from titania or mixtures containing titania. An example of a preferred titania support material particulate is titania powder, e.g. P25 Degussa.

Preferred support materials are substantially free of extraneous components which might adversely affect the catalytic activity of the system. Thus, preferred support materials are at least 95 wt. % pure, more preferably at least 98 wt. % pure and most preferably at least 99 wt. % pure. Impurities preferably amount to less than 1 wt. %, more preferably less than 0.50 wt. % and most preferably less than 0.25 wt. %. The pore volume of the support is preferably more than 0.50 ml/g and preferably more than 0.8 ml/g. The average pore radius (prior to impregnation) of the support material is 10 to 500 Å, preferably 15 to 100 Å, more preferably 20 to 80 Å and most preferably 25 to 40 Å. The BET surface area is suitably from 2 to 1000 $m^2/g$, preferably from 10 to 600 $m^2/g$, more preferably from 15 to 100 $m^2/g$, and most preferably 30 to 60 $m^2/g$.

The BET surface area, pore volume, pore size distribution and average pore radius may be determined from the nitrogen adsorption isotherm determined at 77K using a Micromeritics TRISTAR 3000 static volumetric adsorption analyser. A procedure which may be used is an application of British Standard methods BS4359:Part 1:1984 'Recommendations for gas adsorption (BET) methods' and BS7591: Part 2:1992, 'Porosity and pore size distribution of materials'—Method of evaluation by gas adsorption. The resulting data may be reduced using the BET method (over the pressure range 0.05-0.20 P/Po) and the Barrett, Joyner & Halenda (BJH) method (for pore diameters of 20-1000 Å) to yield the surface area and pore size distribution respectively.

Suitable references for the above data reduction methods are Brunauer, S, Emmett, P H, & Teller, E, J. Amer. Chem. Soc. 60, 309, (1938) and Barrett, E P, Joyner, L G & Halenda P P, J. Am Chem. Soc., 1951 73 373-380.

When in the form of a powder, the median particle size diameter (d50) is preferably less than 50 μm, more preferably less than 25 μm. When the support material is in the form of a granulate, the median particle size diameter (d50) is preferably from 300 to 600 μm. Particle size diameter (d50) may suitably be determined by means of a particle size analyser (e.g. Microtrac S3500 Particle size analyser).

Reference herein to "impregnation" or "impregnating" is intended to refer to contacting the support material with a solution of the cobalt-containing compound and acetic acid, or manganese salt thereof, before drying in order to achieve precipitation of the cobalt-containing compound and, where applicable, the manganese acetate salt. Impregnation with a fully dissolved solution of the cobalt-containing compound ensures good dispersion of the cobalt-containing compound on the support material and is thus preferred. This is in contrast to the use of partially dissolved cobalt-containing compound 'solid solutions' or suspensions where the level of dispersion of the cobalt-containing compound across the surface, and in the pores, of the support material can fluctuate depending on the nature of the precipitation on the support material. Furthermore, use of a fully dissolved solution of the cobalt-containing compound also has less of an impact upon the resulting morphology and bulk crush strength of an extrudate formed thereafter compared with solid solutions. Nevertheless, benefits of the present invention can also be realised in the case where a solid solution of a partially undissolved cobalt-containing compound is used.

Where a powder or granulate of a support material is contacted with a solution of cobalt-containing compound and acetic acid, or a manganese salt thereof, the amount of solution used preferably corresponds to an amount of liquid which is suitable for achieving a mixture which is of a suitable consistency for further processing, for example for shaping by extrusion. In that case, complete removal of the solvent of the impregnating solution may be effected after formation of the extrudate.

Suitable cobalt-containing compounds are those which are thermally decomposable to an oxide of cobalt following calcination and which are completely soluble in the impregnating solution. Preferred cobalt-containing compounds are the nitrate, acetate, hydroxide or acetylacetonate of cobalt, most preferably the nitrate of cobalt, for example cobalt nitrate hexahydrate. It is preferred to avoid the use of the halides because these have been found to be detrimental. In some embodiments, the cobalt containing compound is not cobalt hydroxide.

Preferably, impregnation step (a) affords a synthesis catalyst containing from 5 wt. % to 20 wt. % of cobalt, preferably 7.5 wt % to 12.5 wt % of cobalt, on an elemental basis, based on the total weight of the supported synthesis catalyst.

Preferably, the support material is impregnated with acetic acid in step (a) in an amount from 0.1 to 5 wt. %, preferably 0.25 to 3.5 wt. %, based on the dry weight of the impregnated support material; or the support material is impregnated with a manganese salt of acetic acid in step (a) in an amount from 0.1 to 5 wt. %, preferably 0.25 to 3.5 wt. %, more preferably 0.5 to 2.5 wt. %, most preferably 0.8 to 1.2 wt. %.

It has been found to be particularly advantageous to impregnate the support material in step (a) with acetic acid. Addition of acetic acid at this stage conveniently controls the crystallite size of cobalt oxide formed on the support material, and this effect was also found to be largely independent of the amount of acetic acid added to the support. In particular, it has been surprisingly found that, beyond a point, further increases in acetic acid loading onto the support material gives rise to no further reduction in cobalt oxide crystallite size. Rather, cobalt oxide crystallite size plateaus conveniently to a size range that has been found to be particularly desirable for Fischer-Tropsch selectivity and activity following reduction to afford the active cobalt metal. In particular, the addition of acetic acid advantageously leads to the formation of cobalt oxide crystallites having a size close to an optimum of around 8 nm. Furthermore, the skilled person is readily able to ensure conditions selected for reduction of the cobalt oxide crystallites to cobalt metal on activation to the reduced catalyst are such that cobalt metal particle size is the same or similar to that of the cobalt oxide crystallite size prior to reduction.

Similarly, the addition of a manganese salt of acetic acid was found to lead to a decrease in cobalt oxide crystallite size closer to an optimum range which advantageously leads to an increase in activity and $C_{5+}$ selectivity. The use of a manganese salt of acetic acid therefore enables the size range of the cobalt oxide crystallite size to be optimized for advantageous performance of the active catalyst in the Fischer-Tropsch process.

It has also been found to be possible to use certain additional metal salts of acetic acid in order to control cobalt oxide crystallite size in accordance with further aspects of the invention. The present invention may thus be used to reduce cobalt crystallite below a desired upper limit of particle size (e.g. below 12 nm, preferably below 10 nm) or to ensure that the cobalt oxide crystallite size of crystallites impregnated on the support material is substantially within a desired range of particle sizes (e.g. between 6 to 10 nm, preferably 7 to 9 nm, for example 8 nm).

Impregnation of the support material with the cobalt-containing compound and acetic acid, or manganese salt thereof, in accordance with the process of the present invention may be achieved by any suitable method of which the skilled person is aware, for instance by vacuum impregnation, incipient wetness or immersion in excess liquid. The solvent of the impregnating solution may be either an aqueous solvent or a non-aqueous, organic solvent. Suitable non-aqueous organic solvents include, for example, alcohols (e.g. methanol, ethanol and/or propanol), ketones (e.g. acetone), liquid paraffinic hydrocarbons and ethers. Alternatively, aqueous organic solvents, for example an aqueous alcoholic solvent, may be employed. Preferably, the solvent of the impregnating solution is an aqueous solvent.

In preferred embodiments, in step (a) the support material is impregnated with a single solution or suspension comprising both the cobalt-containing compound and the acetic acid, or manganese salt thereof. Preferably, the solution or suspension is an aqueous solution or suspension.

The concentration of the cobalt-containing compound and acetic acid, or manganese salt thereof, in the impregnating solution is not particularly limited, although preferably the cobalt-containing compound is fully dissolved. When a powder or granulate of support material is impregnated and immediately followed by an extrusion step, the amount of the impregnating solution is preferably suitable for forming an extrudable paste. Preferably, the concentration of the impregnating solution is sufficient to afford from 5 wt. % to 20 wt. % of cobalt, preferably 7.5 wt % to 12.5 wt % of cobalt, on an elemental basis, based on the total weight of the supported synthesis catalyst, following drying and calcination. A suitable concentration of cobalt-containing compound is, for example, 0.1 to 15 moles/litre.

Impregnation of the support material in accordance with the present invention is followed by drying of the impregnating solution in order to effect precipitation of the cobalt-containing compound on to the support material and preferably also to remove bound solvent of the impregnating solution (e.g. water). Drying therefore does not lead to decomposition of the cobalt-containing compound or otherwise lead to a change in oxidation state of the cobalt-containing compound. As will be appreciated, in embodiments where an extrusion is performed, complete drying and removal of solvent (e.g. bound solvent) of the impregnating solution may occur after extrusion. Drying in accordance with the present invention is suitably conducted at temperatures from 50° C. to 150° C., preferably 75° C. to 125° C. Suitable drying times are from 5 minutes to 72 hours. Drying may suitably be conducted in a drying oven or in a box furnace, for example, under the flow of an inert gas at elevated temperature.

Where an extrudate is impregnated in accordance with the present invention, it will be appreciated that the support may be contacted with the impregnating solution by any suitable means including, for instance, vacuum impregnation, incipient wetness or immersion in excess liquid.

Where a powder or granulate of support material is impregnated, the powder or granulate may be admixed with the impregnating solution by any suitable means of which the skilled person is aware, such as by adding the powder or granulate to a container of the impregnating solution and stirring. Where an extrusion step immediately follows impregnation of a powder or granulate, the mixture of powder or granulate and impregnating solution may be further processed if it is not already in a form which is suitable for extruding. For instance, the mixture may be mulled to reduce the presence of larger particles that may not be readily extruded, or the presence of which would otherwise compromise the physical properties of the resulting extrudate. Mulling typically involves forming a paste which is suitable for shaping by extrusion. Any suitable mulling or kneading apparatus of which the skilled person is aware may be used for mulling in the context of the present invention. For example, a pestle and mortar may suitably be used in some applications or a Simpson muller may suitably be employed. Mulling is typically undertaken for a period of from 3 to 90 minutes, preferably for a period of 5 minutes to 30 minutes. Mulling may suitably be undertaken over a range of temperatures, including ambient temperatures. A preferred temperature range for mulling is from 15° C. to 50° C. Mulling may suitably be undertaken at ambient pressures. As stated hereinbefore, it will be appreciated that complete removal of bound solvent from the impregnation solution may be conducted to effect complete precipitation after extrusion.

In embodiments where a calcination step is performed on an impregnated powder or granulate, thereby completely removing solvent of the impregnation solution, the calcined powder or granulate may also be further processed in order to form a mixture which is suitable for extruding. For instance, an extrudable paste may be formed by combining the calcined powder or granulate with a suitable solvent, for example a solvent used for impregnation, preferably an aqueous solvent, and mulled as described above.

In accordance with the process of the present invention, preparation of the supported Fischer-Tropsch synthesis catalyst involves a calcination step in step (b). As will be understood, calcination is required for converting the cobalt-containing compound which has been impregnated on the support material into an oxide of cobalt. Thus, calcination leads to thermal decomposition of the cobalt-containing compound, and not merely removal of bound solvent of an impregnating solution, as in the case of drying in accordance with the present disclosure.

Calcination may be performed by any method known to those of skill in the art, for instance in a fluidized bed or rotary kiln at a temperature of at least 250° C., preferably from 275° C. to 500° C. In some embodiments, calcination may be conducted as part of an integrated process where calcination and reductive activation of the synthesis catalyst to yield a reduced synthesis catalyst are performed in the same reactor.

The supported Fischer-Tropsch synthesis catalyst prepared in accordance with the process of the present invention may additionally comprise one or more promoters, dispersion aids or binders. Promoters are typically added to promote reduction of an oxide of cobalt to cobalt metal, preferably at lower temperatures. Preferably, the one or more promoters is selected from the list consisting of ruthenium, palladium, platinum, rhodium, rhenium, manganese, chromium, nickel, iron, molybdenum, tungsten, zirconium, gallium, thorium, lanthanum, cerium and mixtures thereof. Promoter is typically used in a cobalt to promoter atomic ratio of up to 250:1 and more preferably up to 125:1, still more preferably up to 25:1, and most preferably 10:1. In preferred embodiments, the one or more promoters are present in the cobalt-containing Fischer-Tropsch synthesis catalyst obtained in an amount from 0.1 wt. % to 3 wt. %, on an elemental basis, based on the total weight of the supported synthesis catalyst.

The addition of the promoters, dispersion aids, strength aids, or binders may be integrated at several stages of the process according to the present invention, provided that the support material impregnated in step a) does not comprise a source of metal other than cobalt. Preferably, the promoters, dispersion aids or binders, or precursors thereof, is/are introduced during impregnation step (a). As will be appreciated by the skilled person, use of a manganese salt of acetic acid in accordance with an embodiment of the invention also represents a means for introducing manganese promotor metal into the support material. Similarly, where certain additional metal salts of acetic acid are used in accordance with further aspects of the invention, this may also represent a means for introducing a promotor metal into the support material.

The Fischer-Tropsch synthesis catalyst prepared in accordance with the present invention may conveniently be converted into a reduced Fischer-Tropsch synthesis catalyst by reductive activation by any known means of which the skilled person is aware which is capable of converting cobalt oxide to the active cobalt metal. Thus, in one embodiment, the process of the invention further comprises reducing the cobalt-containing Fischer-Tropsch synthesis catalyst obtained to form a reduced Fischer-Tropsch synthesis catalyst.

In a further aspect, the present invention also provides a supported cobalt-containing Fischer-Tropsch synthesis catalyst obtained or obtainable by the process described herein.

The step of forming a reduced synthesis catalyst may be carried out batch wise or continuously in a fixed bed, fluidised bed or slurry phase reactor. The reduced synthesis catalyst formed following the reductive activation process is useful in the heterogeneously catalysed production of hydrocarbons from syngas by Fischer-Tropsch synthesis, for example in the production of a diesel or aviation fuel or precursor thereof. Fischer-Tropsch synthesis of hydrocarbons from syngas may be represented by Equation 1:

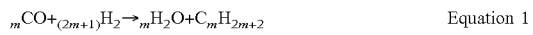

$$mCO + _{(2m+1)}H_2 \rightarrow mH_2O + C_mH_{2m+2}$$ Equation 1

As discussed hereinbefore, the process of the present invention has been surprisingly found to afford a Fischer-Tropsch catalyst exhibiting high $C_{5+}$ hydrocarbon selectivity. Furthermore, at least in some embodiments, the catalytic activity has also been found to be superior. The cobalt-containing Fischer-Tropsch catalyst produced according to the process of the present invention therefore provides gasoline range hydrocarbons when used in a Fischer-Tropsch reaction.

Thus, in another aspect, the present invention also provides a process for converting a feed comprising a mixture of hydrogen and carbon monoxide gases, preferably in the form of a synthesis gas mixture, to hydrocarbons, which process comprises contacting a mixture of hydrogen and carbon monoxide with a support cobalt-containing Fischer-Tropsch synthesis catalyst as defined hereinbefore.

In the Fischer-Tropsch reaction described above, the volume ratio of hydrogen to carbon monoxide ($H_2$:CO) in the gaseous reactant mixture is preferably in the range of from 0.5:1 to 5:1, more preferably from 1:1 to 3:1, and most preferably 1.6:1 to 2.2:1. The gaseous reactant stream may also comprise other gaseous components, such as nitrogen, carbon dioxide, water, methane and other saturated and/or unsaturated light hydrocarbons, each preferably being present at a concentration of less than 30% by volume. The temperature of the Fischer-Tropsch reaction is preferably in the range from 100 to 400° C., more preferably from 150 to 350° C., and most preferably from 150 to 250° C. The pressure is preferably in the range from 1 to 100 bar (from 0.1 to 10 MPa), more preferably from 5 to 75 bar (from 0.5 to 7.5 MPa), and most preferably from 10 to 50 bar (from 1.0 to 5.0 MPa).

In yet a further aspect of the invention, there is provided the use of a supported cobalt-containing Fischer-Tropsch synthesis catalyst as defined herein for increasing the selectivity of a Fischer-Tropsch process for the production of $C_{5+}$ hydrocarbons and/or increasing conversion in a Fischer-Tropsch process.

In a yet further aspect of the invention, there is provided the use of acetic acid, or a metal salt of acetic acid, for controlling cobalt oxide crystallite size in the preparation of a supported cobalt-containing Fischer-Tropsch synthesis catalyst, wherein the metal is selected from the group consisting of ruthenium, palladium, platinum, rhodium, rhenium, manganese, chromium, nickel, iron, molybdenum, tungsten, zirconium, gallium, thorium, lanthanum, cerium and mixtures thereof; preferably wherein the metal is selected from manganese, ruthenium, rhenium and platinum, more preferably the metal is manganese.

It will be appreciated that, where the invention relates to the use of metal salts of acetic acid other than manganese salts of acetic acid, the methods for preparation and general properties of a supported cobalt-containing Fischer-Tropsch synthesis catalyst will be substantially as described previously herein with respect to manganese salts of acetic acid.

In a yet further aspect of the invention, there is provided a method for increasing the selectivity of a Fischer-Tropsch process for the production of $C_{5+}$ hydrocarbons and/or increasing conversion in a Fischer-Tropsch process, said method comprising the step of supplying a cobalt-containing Fischer-Tropsch synthesis catalyst as defined previously herein to a Fischer-Tropsch process.

In a yet further aspect of the invention, there is provided a method for controlling cobalt oxide crystallite size in the preparation of a supported cobalt-containing Fischer-Tropsch synthesis catalyst, said method comprising the step of supplying acetic acid, or a metal salt of acetic acid, during the impregnation of a support material with a cobalt-containing compound, wherein the metal is selected from the group consisting of ruthenium, palladium, platinum, rhodium, rhenium, manganese, chromium, nickel, iron, molybdenum, tungsten, zirconium, gallium, thorium, lanthanum, cerium and mixtures thereof; preferably wherein the metal is selected from manganese, ruthenium, rhenium and platinum, more preferably the metal is manganese.

The invention will now be further described by reference to the following Examples which are illustrative only. In the Examples, CO conversion is defined as moles of CO used/moles of CO fed×100 and carbon selectivity as moles of CO attributed to a particular product/moles of CO converted× 100. Unless otherwise stated, temperatures referred to in the Examples are applied temperatures and not catalyst/bed temperatures. Unless otherwise stated, pressures referred to in the Examples are absolute pressures.

EXAMPLE 1

Catalyst Preparation—with a Manganese Salt of Acetic Acid 55.6 g $Co(NO_3)_2 \cdot 6H_2O$ and varying amounts of $Mn(OAc)_2$ (see Table 1) were mixed in a solution with a small amount of water. This mixture was then added slowly to 100 g P25 $TiO_2$ powder and mixed to obtain a homogeneous mixture. $Co(NO_3)_2 \cdot 6H_2O$ was used in an amount so as to give 10 wt. % elemental Co on $TiO_2$. The resultant paste/dough was extruded to form extrudate pellets and then dried and calcined at 300° C.

TABLE 1

| Mn loading | 1 wt. % | 1.5 wt. % | 2 wt. % | 3 wt. % | 5 wt. % | 10 wt. % |
|---|---|---|---|---|---|---|
| Mass of Mn(OAc)$_2$ | 5.4 g | 8.1 g | 10.8 g | 16.2 g | 27.0 g | 54.0 g |

EXAMPLE 2

Catalyst Preparation—with Acetic Acid 14.82 g Co(NO$_3$)$_2$·6H$_2$O and varying amounts of acetic acid (see Table 2) were mixed in a solution with a small amount of water. This mixture was then added slowly to 27 g P25 TiO$_2$ powder and mixed to obtain a homogeneous mixture. Co(NO$_3$)$_2$·6H$_2$O was used in an amount so as to give 10 wt. % elemental Co on TiO$_2$. The resultant paste/dough was extruded to form extrudate pellets and then dried and calcined at 300° C.

TABLE 2

| AcOH loading | 0.5 wt. % | 1 wt. % | 2 wt. % | 3 wt. % |
|---|---|---|---|---|
| Mass of AcOH | 0.656 g | 1.310 g | 2.620 g | 3.930 g |

COMPARATIVE EXAMPLE 1

Catalyst Preparation—without Acetic Acid or Manganese Acetate 14.8 g Co(NO$_3$)$_2$·6H$_2$O was mixed in a solution with a small amount of water. This mixture was then added slowly to 27 g P25 TiO$_2$ powder and mixed to obtain a homogeneous mixture. Co(NO$_3$)$_2$·6H$_2$O was used in an amount so as to give 10 wt. % elemental Co on TiO$_2$. The resultant paste/dough was extruded to form extrudate pellets and then dried and calcined at 300° C.

COMPARATIVE EXAMPLE 2

Catalyst Preparation—without Acetic Acid or Manganese Acetate 14.82 g Co(NO$_3$)$_2$·6H$_2$O and 0.98 g Mn(NO$_3$)$_2$ were mixed in a solution with a small amount of water. This mixture was then added slowly to 27 g P25 TiO$_2$ powder and mixed to obtain a homogeneous mixture. Co(NO$_3$)$_2$·6H$_2$O was used in an amount so as to give 10 wt. % elemental Co on TiO$_2$. The resultant paste/dough was extruded to form extrudate pellets and then dried and calcined at 300° C.

EXAMPLE 3

Catalyst Preparation—Mn Nitrate and Acetic Acid

The procedure of Comparative Example 2 was followed, except with the addition of 0.656 g acetic acid alongside Co(NO$_3$)$_2$·6H$_2$O and Mn(NO$_3$)$_2$.

COMPARATIVE EXAMPLE 3

Catalyst Preparation—with Manganese Acetate (Sequential Impregnation)

5.93 g Co(NO$_3$)$_2$·6H$_2$O was mixed in a solution with a small amount of water. This mixture was then added slowly to 10.7 g P25 TiO$_2$ powder and mixed to obtain a homogeneous mixture. Co(NO$_3$)$_2$·6H$_2$O was used in an amount so as to give 10 wt. % elemental Co on TiO$_2$. The resultant paste/dough was extruded to form extrudate pellets and then dried and calcined at 300° C. The resultant Co/TiO$_2$ catalyst was impregnated with 0.54 g Mn(OAc)$_2$ so as to give 1 wt. % Mn on the TiO$_2$ then dried and calcined to give a sequentially impregnated CoMn/TiO$_2$ catalyst.

EXAMPLE 4

Effect of Mn(OAc)$_2$ and Acetic Acid on Co$_3$O$_4$ Particle Size

Catalysts prepared by the above procedures were analysed by X-ray diffraction to obtain a measurement of the average size of Co$_3$O$_4$ crystallites on the TiO$_2$ support.

Table 3 shows crystallite size for catalysts prepared by the methods of Examples 1 to 3 and Comparative Examples 1 to 3.

TABLE 3

| Example | Catalyst - 10 wt. % Co on TiO$_2$ prepared with: | Co$_3$O$_4$ average size (nm) |
|---|---|---|
| E1 | 1 wt. % Mn (Mn(OAc)$_2$) | 8.1 |
|  | 1.5 wt. % Mn (Mn(OAc)$_2$) | 5.7 |
|  | 2 wt. % Mn (Mn(OAc)$_2$) | 4.9 |
|  | 3 wt. % Mn (Mn(OAc)$_2$) | 3.4 |
|  | 5 wt. % Mn (Mn(OAc)$_2$) | 2.3 |
|  | 10 wt. % Mn (Mn(OAc)$_2$) | 2.8 |
| E2 | 0.5 wt. % Acetic acid | 8.9 |
|  | 1 wt. % Acetic acid | 7.3 |
|  | 2 wt. % Acetic acid | 8.3 |
|  | 3 wt. % Acetic acid | 8.4 |
| CE1 | n/a | 10.7 |
| CE2 | 1 wt. % Mn (Mn(NO$_3$)$_2$) | 12.1 |
| E3 | 1 wt. % Mn (Mn(NO$_3$)$_2$) + AcOH | 7.8 |
| CE3 | 1 wt. % Mn (Mn(OAc)$_2$) (sequential impregnation) | 20.9 |

The results in Table 3 show that the size of Co$_3$O$_4$ crystallites can be controlled by the addition of acetic acid, or the manganese salt thereof, during preparation of the catalyst. While addition of Mn acetate achieves an optimal crystallite size (~8 nm) at 1% loading and decreasing size with increasing Mn acetate loading, acetic acid addition was found to give optimal crystallite sizes of around 8 nm when any amount above 0.5% loading was used.

Both acetic acid and Mn acetate addition showed an improvement over Comparative Example 1 where only cobalt nitrate was used without any acetic acid or manganese acetate. Comparative Example 2 shows that the use of Mn nitrate in place of acetate does not give the same advantageous reduction in crystallite size. However, Example 3 shows clearly that by adding acetic acid to the Mn nitrate and cobalt, a crystallite size of around 8 nm is obtained.

Comparative Example 3 shows that the benefits of the present invention cannot be obtained by subsequently impregnating with Mn acetate a dried and calcined Co/TiO$_2$ catalyst, followed by further drying and calcining.

EXAMPLE 5

General Procedure for Fischer-Tropsch Reactions 10 ml of catalyst was charged into a microreactor and reduced under a $H_2$ stream (15 h, 300° C., 100% $H_2$, 0.1 MPa). The gaseous supply was switched to a mixture of hydrogen and carbon monoxide ($H_2$/CO=1.8) comprising 18% nitrogen and the pressure maintained at 4.3 MPa. The temperature was raised to 195° C. and maintained throughout the Fischer-Tropsch reaction.

EXAMPLE 6

Effect of Mn(OAc)$_2$ and Acetic Acid on Fischer-Tropsch Reactions

Catalysts prepared according to Example 1, using 9.88 g Co(NO$_3$)$_2$·6H$_2$O, 21.4 g P25 TiO$_2$ powder and varying amounts of Mn(OAc)$_2$ (0.09 g—0.1 wt. % Mn; 0.22 g—0.25 wt. % Mn; 0.45 g—0.5 wt. % Mn; 0.89 g—1 wt. % Mn; 1.79 g—2 wt. % Mn), were used in Fischer-Tropsch synthesis according to Example 5. The results are shown in Table 4.

CO conversion, CH$_4$ selectivity, C$_{5+}$ selectivity, and C$_{5+}$ productivity data were compiled and results for the above Examples are provided in Table 4 below. Exit gasses were sampled by on-line mass spectrometry and analysed. The C$_{5+}$ selectivity is determined by difference from the C$_1$-C$_4$ components in the gas phase. The CH$_4$ selectivity is determined by difference from the C$_{2+}$ components in the gas phase. The productivity of the catalyst is defined as the weight in grams of products formed over the catalyst per litre of packed catalyst volume per hour of reaction time. Values for CO conversion, CH$_4$ selectivity, C$_{5+}$ selectivity, and productivity are average values obtained at steady state.

TABLE 4

| Catalyst - 10 wt. % Co on TiO2 prepared with: | GHSV (h$^{-1}$) | CO conv. (%) | CH$_4$ sel. (%) | C$_{5+}$ sel. (%) | CH$_4$ prod. (g/h/l) | C$_{5+}$ prod. (g/h/l) | C$_{5+}$/CH$_4$ prod. |
|---|---|---|---|---|---|---|---|
| 0.1 wt. % Mn | 690 | 34.7 | 16.2 | 75.4 | 9.2 | 42.9 | 4.66 |
| 0.25 wt. % Mn | 697 | 42.7 | 14.6 | 78.2 | 10.3 | 55.1 | 5.35 |
| 0.5 wt. % Mn | 725 | 50.8 | 13.6 | 79.9 | 11.6 | 68.3 | 5.89 |
| 1% wt. Mn | 682 | 56.3 | 12.2 | 81.3 | 11.1 | 74.0 | 6.67 |
| 2% wt. Mn | 691 | 54.1 | 12.0 | 78.4 | 10.3 | 68.1 | 6.61 |

The results in Table 4 show that, at constant temperature and pressure, the activity of the CoMn/TiO$_2$ catalyst increases with increasing loading of Mn acetate, achieving a maximum at 1 wt. % Mn acetate, which corresponds to the loading shown to give a Co$_3$O$_4$ crystallite size of around 8 nm. Crucially, increased loadings of Mn acetate also give an increasing C$_{5+}$/CH$_4$ productivity ratio, again reaching a maximum at 1 wt. % Mn acetate loading.

In addition, Table 5 below shows the effect of the rate on CO conversion per gram of catalyst for Mn acetate impregnated simultaneously (as in Example 1), Mn acetate impregnated sequentially (as in Comparative Example 3) and without Mn acetate (as in Comparative Example 1). Rate is defined as mmol of CO converted per hour, per gram of catalyst.

The results in Table 5 further demonstrate that the benefits of the present invention cannot be obtained by sequential impregnation.

TABLE 5

| Loading (wt. %) | Impregnation | GHSV (h$^{-1}$) | Rate (mmol/h/g) |
|---|---|---|---|
| 0% | N/A | 1550 | 3.2 |
| 1 wt. % Mn | Simultaneous (with cobalt) | 1500 | 5.0 |
| 1 wt. % Mn | Sequential (after cobalt) | 710 | 3.8 |

The invention claimed is:

1. A process for preparing a supported cobalt-containing Fischer-Tropsch synthesis catalyst, said process comprising:
   (a) impregnating an extrudate material with: i) a cobalt-containing compound and ii) acetic acid, or a manganese salt of acetic acid, in a single impregnation step to form an impregnated extrudate; and
   (b) drying and calcining the impregnated extrudate to provide the supported cobalt-containing Fischer-Tropsch synthesis catalyst;
   wherein the extrudate material impregnated in step (a) is selected from the group consisting of silica, ceria, gallia, titania, magnesia, zinc oxide, or any mixture of two or more thereof, and has not previously been modified with a source of metal other than cobalt; and
   wherein when the cobalt containing-compound is cobalt hydroxide, a manganese salt of acetic acid is not used in step (a) of the process, and
   wherein the supported cobalt-containing Fischer-Tropsch synthesis catalyst comprises cobalt oxide crystallites below 10 nm in particle size.

2. The process according to claim 1, wherein the extrudate material is in the form of a powder having a median particle size diameter (d50) of less than 50 μm, or wherein the support material is in the form of a granulate having a median particle size diameter (d50) of from 300 to 600 μm.

3. The process according to claim 1, wherein the extrudate material is impregnated with a solution or suspension comprising i) the cobalt-containing compound and ii) acetic acid or a manganese salt of acetic acid.

4. The process according to claim 3, wherein the solution or suspension is an aqueous solution or suspension.

5. The process according to claim 1, wherein the cobalt-containing compound is the nitrate, acetate, hydroxide or acetylacetonate of cobalt.

6. The process according to claim 1, wherein the extrudate material is impregnated with acetic acid in step (a) in an amount from 0.1 to 5 wt. %, based on the dry weight of the impregnated extrudate material; or wherein the extrudate material is impregnated with a manganese salt of acetic acid in step (a) in an amount from 0.1 to 5 wt. %.

7. The process according to claim 1, wherein impregnation step (a) affords a synthesis catalyst containing from 5 wt. % to 20 wt. % of cobalt, on an elemental basis, based on the total weight of the supported synthesis catalyst.

8. The process according to claim 1, wherein the cobalt-containing Fischer-Tropsch synthesis catalyst obtained comprises one or more promoters, dispersion aids, strength aids and/or binders.

9. The process according to claim 8, wherein the one or more promoters, dispersion aids and/or binders, or precursors thereof, is/are introduced during impregnation step (a).

10. The process according to claim 8, wherein the one or more promoters are present in the cobalt-containing Fischer-Tropsch synthesis catalyst obtained in an amount from 0.1 wt. % to 3 wt. %, on an elemental basis, based on the total weight of the supported synthesis catalyst.

11. The process according to claim 1, wherein calcining in step (b) is conducted at a temperature of at least 250° C.

12. The process according to claim 1, further comprising reducing the cobalt-containing Fischer-Tropsch synthesis catalyst obtained to form a reduced Fischer-Tropsch synthesis catalyst.

13. The process of claim 1, wherein the extrudate material is selected from titania and zinc oxide.

14. The process of claim 1, wherein the extrudate material is selected from titania or mixtures containing titania.

15. A method for controlling cobalt oxide crystallite size in the preparation of a supported cobalt-containing Fischer-Tropsch synthesis catalyst, said method comprising the step of supplying acetic acid, or a metal salt of acetic acid, during the impregnation of a support material with a cobalt-containing compound, wherein the support material has not previously been modified with a source of metal other than cobalt, wherein the metal is selected from the group consisting of ruthenium, palladium, platinum, rhodium, rhenium, manganese, chromium, nickel, iron, molybdenum, tungsten, zirconium, gallium, thorium, lanthanum, cerium and mixtures thereof.

16. The method of claim 15, wherein the acetic acid or metal salt of acetic acid is provided in an amount sufficient to result in a supported cobalt-containing Fischer-Tropsch synthesis catalyst comprises cobalt oxide crystallites below 10 nm in particle size.

* * * * *